United States Patent Office 3,784,538
Patented Jan. 8, 1974

3,784,538
CONTROLLING A HIGH-PRESSURE REACTOR
Helmut Pfannmueller, Brasschaat, Antwerp, Belgium, and Friedrich Urban, Limburgerhof, and Oskar Buechner, Hans Gropper, and Wolf Sistig, Ludwigshafen, Germany, assignors to Badische Anilin- & Soda-Fabrik Aktiengesellschaft, Ludwigshafen (Rhine), Germany
Filed Sept. 20, 1971, Ser. No. 182,006
Claims priority, application Germany, Sept. 25, 1970,
P 20 47 290.6
Int. Cl. C08f 1/60, 3/04
U.S. Cl. 260—94.9 R    6 Claims

ABSTRACT OF THE DISCLOSURE

A process for polymerizing olefins at high pressure in tubular reactors in which the pressure is lowered at intervals for short periods, the whole of the tubular reaction zone being subdivided one or more times and the decreases in pressure being carried out in only one subdivision, and a number of examples of construction of appropriate reaction zones and control equipment for carrying out the process.

---

Figure 1:
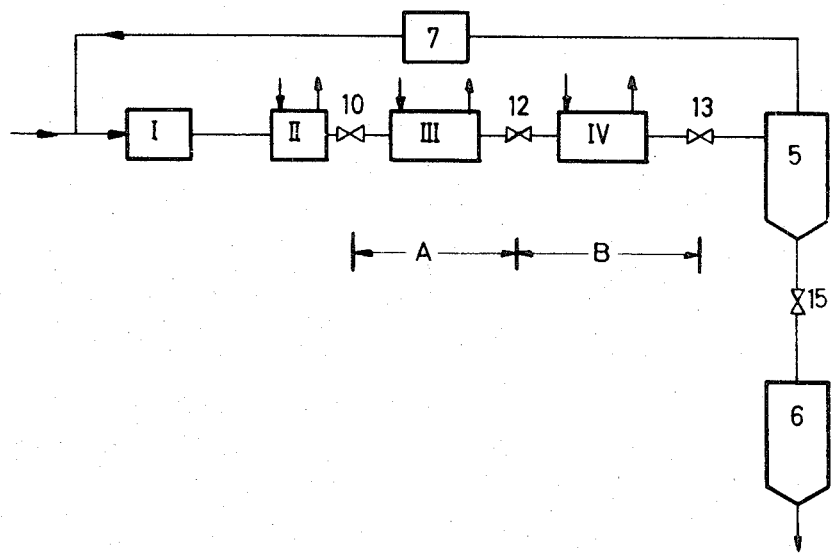

The invention relates generally to polymerization processes carried out under high pressure and particularly to the regulation of pressure in a polymerization plant during periodic actuation of expansion valves and to the control equipment associated therewith.

The polymerization of ethylene in tubular reactors at temperatures of from 100° to 400° C. and pressures of up to 3500 atmospheres gauge using catalysts forming free radicals is known. The catalysts used are oxygen, inorganic or organic peroxides, for example sodium persulfate, benzoyl peroxide, lauroyl peroxide or azo compounds such as azobisisobutyronitrile. High-energy radiation is also suitable for initiating polymerization.

The reaction of ethylene to form polymers is mainly determined by its heat effects. It is strongly exothermic. In order that a favorable course of the reaction should be achieved, every effort is therefore made to remove as much heat as possible from the reaction tube, because the yield achievable is practically directly dependent thereon. Theoretically speaking, the amount of heat directly removable by way of a coolant flowing around the reaction tube is proportional to the thermal conductivity of the ethylene reaction mixture, that of the tubes of the reactor and that of the cooling medium. In practice however the following disadvantageous phenomena have to be taken into consideration:

Polyethylene formed adheres as a deposit to the inner wall of the reactor and substantially decreases the thermal conductivity to the tube wall. The deposit becomes detached from time to time, migrates through the reactor and in this way disturbs the course of the polymerization. In the extreme case, this wall deposit which becomes detached causes plugging. As a consequence, marked, rapid increases in pressure occur in the reactor, which in turn result in decomposition of the reaction mixture.

A method of operating tubular reactors which is intended to counteract the abovementioned drawbacks has been described in U.S. Pat. No. 2,852,501. According to this method, the reactor is freed from wall deposits by periodic decreases in pressure by up to 800 atmospheres gauge. This is usually effected by decreasing the pressure in the reactor from for example 2000 atmospheres gauge to 1200 atmospheres gauge at intervals of from five seconds to two minutes. For this purpose there is provided at the exit end of the reactor a let-down valve at which the pressure is lowered by a fixed predetermined amount for a short period. At the same time the pressure is measured at the entrance into the reactor. The let-down valve is then closed until the reaction pressure has again been reached. The let-down valve, which is constructed as a regulating valve, then keeps the reaction pressure constant until the next decrease in pressure. In essence this method has proved its value. It does have some disadvantages however in that the bulk or a considerable amount of the ethylene introduced into the reaction chamber is expanded. Both losses in energy and inferior quality of the product are the result.

The reactor according to U.S. Pat. 2,852,501 is designed in such a way that a high-pressure compressor introduces ethylene by way of a valve located in front of the tubular reactor into the reaction chamber. The gas is heated up in sections or step by step until polymerization is initiated. The heat of reaction formed (a) heats the reaction mixture and (b) is absorbed by a coolant surrounding the reactor tubes. The temperature of the coolant is kept below the temperature of the reaction gas.

It is an object of the present invention to avoid as far as possible the deterioration in quality and the losses in energy occasioned by the decrease in pressure. Another object of the invention is to manufacture a product having the highest possible density and a narrow molecular weight distribution in a polymerization plant with given operating conditions.

In accordance with the invention, this object is achieved by subdividing at least once the whole of the treatment zone which is to be kept under pressure and carrying out short-duration decreases in pressure over only one of the subdivisions constituting a reaction zone. In a preferred embodiment for carrying out the process, pressure-maintaining valves are located as the pressure-regulating members at the points of subdivision of the treatment zone and during the short-duration decrease in pressure brought about by means of a let-down valve located at the end of the reaction zone the said pressure-maintaining valves are throttled for a short period.

According to another feature of the invention a polymerization plant comprises, for the purpose of maintaining the pressure in a plurality of subdivisions, an appropriate number of pressure-maintaining valves each of which is associated with one of a plurality of feed zones for the reaction mixture. Furthermore, in accordance with the invention, these pressure holding valves, which are throttled when the expansion valve is opened, advantageously respond with a short time lag. The pressure-maintaining valve nearest to the let-down valve is actuated first.

The process according to the invention and polymerization plant having tube reactors constructed accordingly offer advantages in various respects. The most favorable method of operation of the pressure-maintaining valve located at the point of division of the treatment zone is that in which the pressure in the treatment zone between the ethylene compressor and the said pressure-maintaining valve is not decreased at all. The point in the tube reactor zone which is most advantageous for installation of the pressure-maintaining valve is that at which the temperature of the reaction mixture rises above the temperature of the coolant. At this point in the treatment zone the polymerization has set in to such an extent that it is necessary for the heat of polymerization to be removed by means of the coolant surrounding the tubes. A substantial advantage is that the time which would be required for a decrease in pressure in the entire treatment zone up to restoration of the reaction pressure is shortened as the volume subjected to pressure decreases is made smaller. For example if the subdivision between the pressure-maintaining valve and the let-down valve constitutes 50% of the whole zone to be kept under pressure, the time for lowering and restoring the pressure is shortened by 50% when the amount of gas supplied from the high-pressure compressor is kept constant. There is also the surprising advantage that the pressure at the outlet of the treatment zone, even in absolute terms, does not have to be lowered as much as in an identical reactor operated without a pressure-maintaining valve at the point of division of the treatment zone. Furthermore, if the temperatures of the reaction mixtures measured in the reactor with and without a pressure-maintaining valve it is found that in the process according to the invention there is a much smaller range of temperature fluctuation for a reactor provided with a pressure-maintaining valve. This narrow range of fluctuation is of special advantage in that part of the reactor in which polymerization is initiated.

In comparative experiments to test the process the same absolute pressure was used in the reaction zone. Furthermore the intervals between the beginning of one decrease in pressure and the beginning of the following decrease were kept constant. Comparative pressure decreases were also measured at those points up to which they were still effective in the treatment zone. The advantage of a polymerization plant constructed in accordance with the invention is particularly evident when the influence of pressure and temperature on the polymerization of ethylene under high pressure is assessed. Pressure and temperature not only determine the output of product achievable by the reaction but also have a profound effect on the properties of the product. The output increases with increasing pressure. The plant is therefore always operated at the highest possible pressure. In a reactor in which the pressure is lowered periodically, the mean reaction pressure (the effective pressure) is always lower than the nominal pressure. A tube reactor provided with a pressure-maintaining valve to subdivide the treatment zone has a higher effective pressure. This results not only from the shortened time for the individual short-duration decreases in pressure but also from the decrease in pressure at the exit of the reactor not being so large.

The temperatures of the reaction mixture determine the amount of the output of polymer in a similar way. At each decrease in pressure the temperature of the reaction mixture falls as a consequence of the lower rate of reaction at the lower pressure, especially since the initiator concentration is correlated to the pressure in the steady state. Therefore, the higher the level of the average temperatures of the reaction mixture, the larger the amount of product discharged from the reaction zone. The present process in which the pressure is lowered only in subdivisions of the treatment zone to be kept under pressure, results in smaller fluctuations in temperature and consequently higher average temperature values, presupposing the same high maximum temperatures in the reaction zone in the case of operation with and without a pressure-maintaining valve at the point of division of the treatment zone.

It will readily be seen that smaller fluctuations in pressure and temperature in the treatment zone and particularly the immediate reaction zone make it possible to effect better control of the reaction. The reaction remains longer in stationary equilibrium because the physical conditions are closer than in prior art methods to those in the case which is ideal from the point of view of process technology, i.e. in which no fluctuations whatever take place. A specific equilibrium is set up at every pressure and every temperature. For each equilibrium there is formed a product having a specific molecular weight distribution; this means that if appreciable fluctuations in pressure and temperature occur products are formed which differ from each other within certain limits. A correspondingly heterogeneous mixture of polymer is discharged from the reactor, a mixture which is unsuitable for certain applications. Thus the present process gives not only a better product but also results in considerable improvements as regards the application of the polymer.

The process also involves another advance in that region of the reaction zone in which the polymerization sets in. At this point the temperature of the medium surrounding the reaction tube is higher than the temperature of the reaction mixture. Following each decrease in pressure, a slowing down of the rate of flow in the treatment zone takes place during the subsequent recompression. Another consequence of this is that in those portions of the reaction zone in which the reaction threshold is almost reached, or the reaction has just started, overheating occurs and decomposes the reaction mixture. Such disturbances are generally avoided by choosing very small temperature gradients, i.e. by heating up slowly. Slow heating however requires an increase in the length of the reaction zone, which results in larger pressure loss. In the embodiment of a polymerization plant constructed with subdivisions using pressure-maintaining valves, the subdivision located upstream of the pressure-maintaining valve and not exposed to the decrease in pressure is shorter. In this subdivision the gas may consequently be brought rapidly and without the said disadvantages to the starting temperature of the reaction and the tubular reactor in this section can be considerably shortened. The pressure-maintaining valve makes it possible to control the start of the reaction very precisely because no great fluctuations in pressure and temperature take place upstream of the valve and moreover a constant rate of flow always prevails in this region. Moreover, owing to these conditions which are far more constant than those in prior art plant, overheating is avoided and the transfer of heat from the heating medium to the reaction mixture is improved because the transfer of heat depends on the pressure. Finally the pressure-maintaining valve at the point of division of the treatment zone makes it possible to maintain the highest possible pressure in the region where the reaction sets in.

The process also involves considerable improvements for the section of the polymerization plant situated downstream of the pressure-maintaining valve, which consists essentially of the reaction zone proper and the parts of the plant for product separation beyond the let-down valve. The product separator or the plurality of successive product separators whose task it is to separate the polymer from the unreacted monomers and which are located downstream of the let-down valve may be made smaller without loss in efficiency occurring. In the case of conventional large decreases in pressure the first of the separators or the single separator downstream of the let-down valve is subjected to high loading. If according to the new process the absolute amount of the decrease in pressure and the amount of gas to be expanded are less, the separator may be made smaller and cheaper. The use of a smaller separator results in an improved product because less product is deposited on its interface and wall than in a larger separator. The coating of polymer detached from the separator wall is known to have properties different from those of the fresh product which has passed the separator rapidly, so that the homogeneity of the mixture withdrawn varies accordingly.

In short, the improved process and a polymerization plant constructed accordingly give:

(1) A higher effective pressure;
(2) Better reaction control;
(3) Greater stability of the reaction;
(4) A smaller pressure loss in a tubular reactor which is shorter in length; and
(5) A product having improved properties.

The invention will now be described in greater detail with reference to the diagrammatic drawings which show ethylene polymerization plant for carrying out the process.

FIG. 1 shows the general design of a plant incorporating the features of the present invention. Compressor I passes a mixture of ethylene with various additions necessary for the polymerization at high pressure into the buffer vessel and preheater II in which the pulsation caused by the compressor is damped and the reaction mixture is heated up. The reaction mixture passes through open-close valve 10 to starting reactor III. Polymerization is initiated in this subdivision A of the whole tubular reactor by adequate heat supplied by a heating medium. The mixture then passes through a pressure-maintaining valve 12 to the actual reactor IV which dissipates the heat of reaction through its wall. The pressure-maintaining valve 12 keeps the pressure downstream of the compressor I and the valve 10, i.e. in the portions II and III of the plant, constant at all times. Reactor IV in the subdivision B of the tubular reactor which is subjected to pressure decreases of short duration is cooled by a coolant whose temperature is lower than the tempertaure of the gas mixture present at the inlet of the reactor IV. The let-down valve 13 normally maintains the pressure in reactor IV constant at the desired value. The short-duration decreases in pressure are brought about by let-down valve 13. The reaction product leaving reactor IV is flashed into high-pressure separator 5. The polyethylene is separated therein from unreacted ethylene. The polymer which is in molten form passes through valve 15 into low-pressure separator 6. It is then processed by conventional methods. The gas from the high-pressure separator 5 is cooled by a plant 7 (provided for the purpose and not described in any greater detail) and returned to compressor I.

Figure 2:
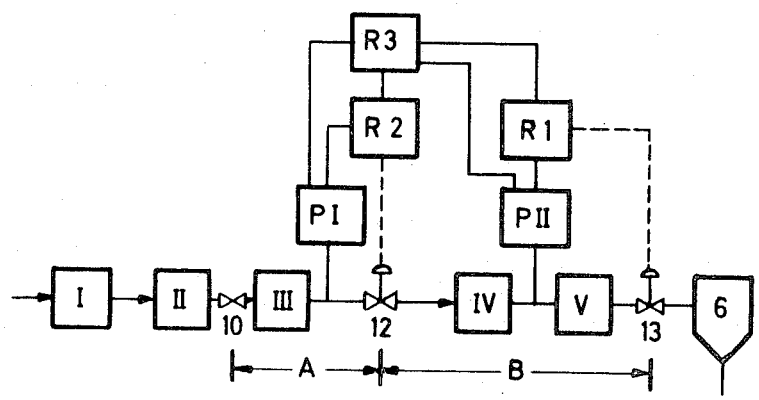

FIG. 2 shows a similar polymerization plant with the tubular reactor being shown together with control members. A pressure pick-off PI is installed upstream of the pressure-maintaining valve 12; another pressure pick-off PII is located between the sections IV and V of the tubular reactor in the subdivision B downstream of the pressure-maintaining valve 12. The control means include regulators R1, R2 and R3. They operate as follows: Members PII and R1 regulate the pressure in sections IV and V of the reactor through let-down valve 13. This regulation includes the periodic decrease in pressure in the reactor portions IV and V effected by opening the let-down valve 13. The drops in pressure are initiated by the let-down valve 13 being opened by the regulator R1 for a short time to such an extent that the pressure at the pressure pick-off PII is lowered by a specific amount, for example 400 atmospheres gauge. The letdown valve 13 then closes again until the desired pressure of from example 2300 atmospheres gauge has been reached. The valve 13, controlled by regulator R1, keeps the pressure constant at for example 2300 atmospheres gauge until the next drop in pressure after for example forty seconds.

Figure 4:
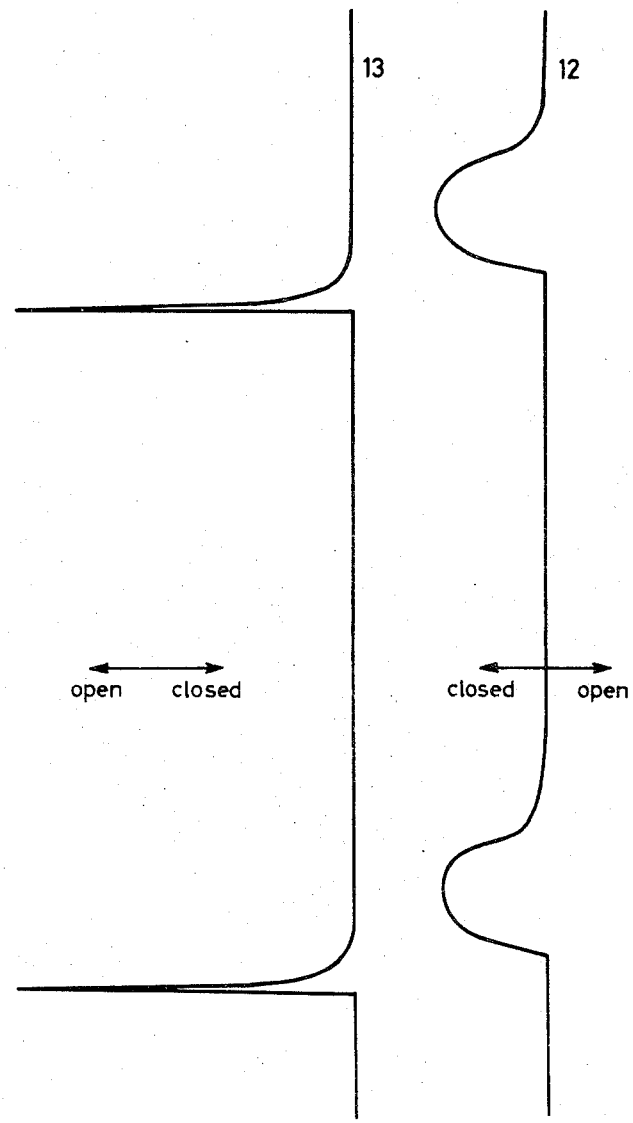

The unit consisting of regulator R2 and pressure pick-off PI controls the pressure-maintaining valve 12 so that the pressure measured at PI remains constant, for example at 2500 atmospheres gauge, i.e. about 200 atmospheres gauge higher than the pressure measured downstream of the pressure-maintaining valve 12. An additional regulator R3 is necessary to achieve this. It is programmed to deal with input values in such a way that its output makes it possible for the regulator R2 to keep constant the pressure at the pick-off PI. Regulator R3 determines the rate of pressure drop caused by opening the let-down valve 13. For this operation there is supplied to it the opening impulse for the let-down valve 13 which is generated by regulator R1. A constant magnitude for this control engineering design is the distance between the pressure-maintaining valve 12 and the pick-off PII, on the one hand, and the let-down valve 13 on the other. The pressure pick-off PII divides the section between the pressure-maintaining valve 12 and the let-down valve 13, for example in the ratio 1:1. The regulator R3 also determines the magnitude of the pressure drop measured at the pick-off PII. The said input magnitudes for the regulators, i.e. the rate of pressure drop, the extent of the pressure drop, the ratio of the distances between the pressure-maintaining valve 12 and the pick-off PII and between the pick-off PII and the let-down valve 12, and the pressure measured at pick-off PI, are processed by the appropriately programmed regulator R3 into a signal which is supplied to regulator R2. The effect of this signal is that regulator R2 initiates the closing of the pressure-maintaining valve 12. The pressure-maintaining valve 12 closes prior to the occurrence of a pressure drop at the pick-off PI, i.e. in the subdivision A. After the decrease in pressure in the reaction zones IV and V has been completed, the input magnitudes of the regulator R3 are again dealt with in such a way that the pressure-maintaining valve 12 opens again while the let-down valve 13 closes, so that the pressure remains constant at the pick-off PI. The opening and closing movements and the time lag in the movement of the valves 12 and 13 are shown diagrammatically in FIG. 4.

Figure 3:
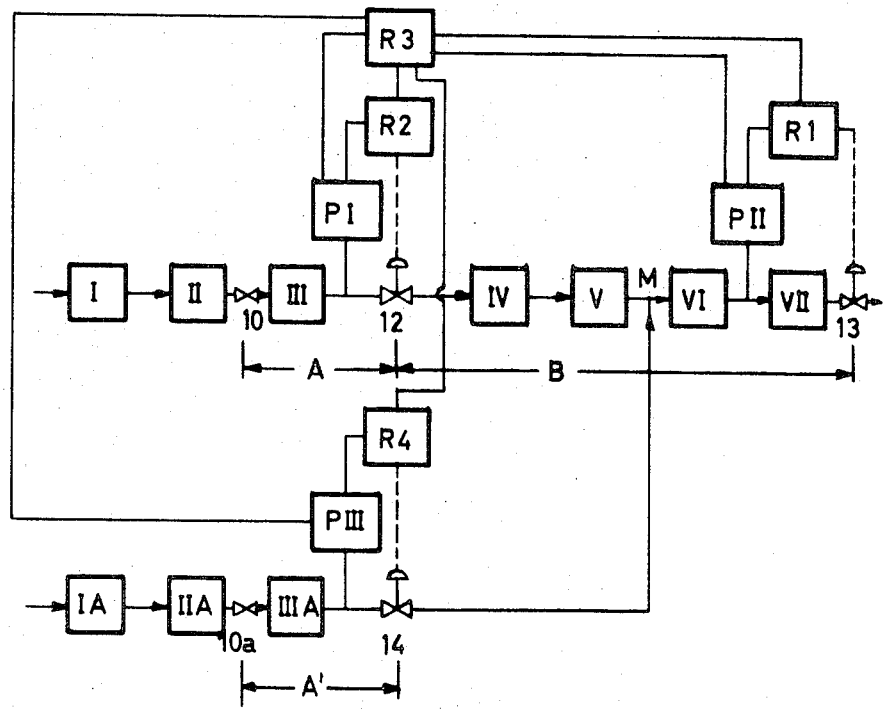

A tubular reactor having two pressure-maintaining valves 12 and 14 and two subdivisions A and A' is shown in FIG. 3. A further compressor IA is provided which operates at the same high pressure as the compressor I. The compressor IA compresses a mixture consisting of ethylene and the additives necessary for polymerization. Through the feed zone formed by the compressor IA, the buffer vessel IIA and the starting reactor IIIA a mixture may be supplied which has the same composition as, or a different composition from, that which is suplied through compressor I. Moreover the parts IA, IIA and IIIA of the plant and the pressure-maintaining valve 14 may either be the same size as, or be different in size from, the corresponding plant portions I, II and III and the pressure-maintaining valve 12. Different dimensioning of the two feed zones is necessary when the gas streams fed to the two zones differ from one another quantitatively. The plant portions VI and VII are further reaction zones which have in principle the same construction as the portions IV and V of the embodiment of a plant according to FIG. 2. PII is again the pressure pick-off installed between the portions IV and V. The let-down valve 13 is also identical to that of the plant according to FIG. 3. At the mixing point M the reacton mixture coming from the sections IV and V (which already contains polyethylene formed in these sections) is mixed with the gas still devoid of polymers supplied via the portions IA, IIA, IIIA and the pressure-maintaining valve 14. The new mixture is again subjected to polymerization in the portions VI and VII before it is flashed through valve 13.

The pick-off PII is provided with regulators R1 and R3 to regulate the reaction pressure in the portions IV, V, VI and VII. Periodic decreases in pressure effected by these functional units extend exclusively to the reaction subdivisions IV, V, VI and VII. By means of the regulator R1, the let-down valve 13 is opened for a short time to such an extent that the pressure at the pick-off PII is decreased by a specific amount, for example 600 atmospheres gauge. After this the let-down valve 13 closes again for a short time until the desired pressure of, for example, 2400 atmospheres gauge has been reached. Until the next decrease in pressure, for example after forty seconds, the let-down valve, controlled by R1, keeps the pressure constant at, for example, 2400 atmospheres gauge.

Figure 5:
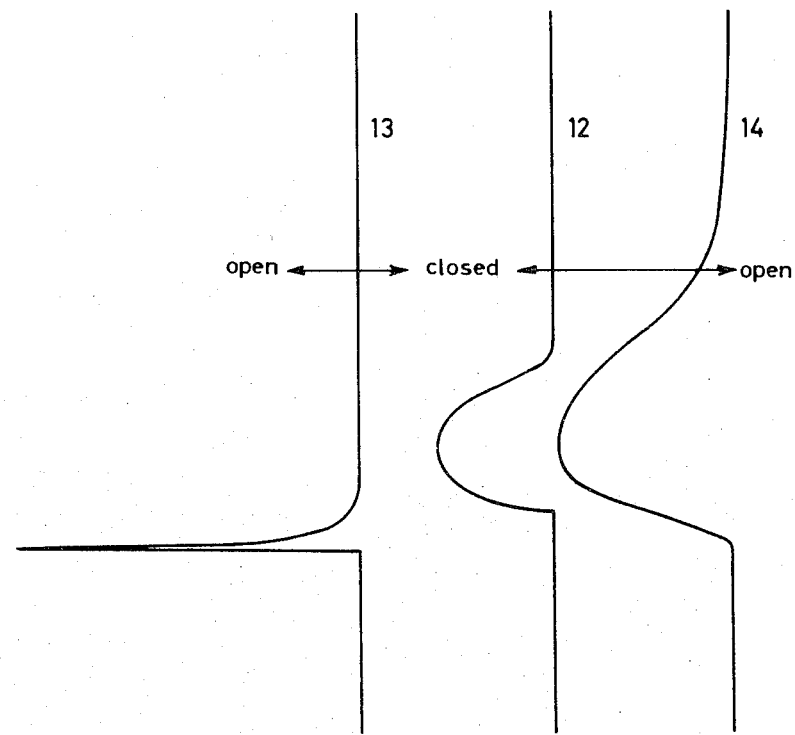

The functional unit consisting of the regulator R2 and the pressure pick-off PI regulates the pressure-maintaining valve 12 so that the pressure measured at PI remains constant, for example at 2500 atmospheres gauge. This pressure is about 100 atmospheres higher than that downstream of the pressure-maintaining valve 12. The functional unit formed by pressure pick-off PIII and the regulator R4 takes care of a corresponding constant pressure upstream of the pressure-maintaining valve 14, i.e. in the portions IA, IIA and IIIA. Regulators R2 and R4 act in the same way. In order that in this case a constant pressure may be maintained at PI and PIII, an additional regulator R3 is necessary. It is programmed in such a way that the input valves are dealt with so that the pressure-maintaining valves 12 and 14 close slowly before the pressure drop caused by opening the let-down valve 13 is effective at the pick-offs PI and PII. The regulator R3 first determines the speed and magnitude of the pressure drop in the portion VII in cooperation with the pick-off PII. To determine the speed of pressure drop, the impulse emanating from regulator R1 is supplied to the regulator R3 for opening the let-down valve 13. From this the regulator then determines the delay with which first the pressure-maintaining valve 14 and then the pressure-maintaining valve 12 have to be closed slowly. The distance from the pick-off PIII to the valve 14 is for example the same as that from pick-off PII to the let-down valve 13. In this case the pressure-maintaining valve 14 closes with a delay with respect to the expansion valve 13 of 0.4 second. The time lag of the closing and opening movements of the pressure-maintaining valves 12 and 14 and of the let-down valve 13 may be seen from FIG. 5. The closing process of the pressure-maintaining valves 12 and 14 may be varied by adjusting the set points at the regulators R2 and R4.

In an embodiment of the plant according to FIG. 3 the impulse for opening the let-down valve 13 is also transmitted from regulator R1 to regulator R3. The regulator R3 then determines, as it does for the first closing operation of the pressure-maintaining valves 12 and 14, the delay with respect to the phase-opposed movements of the let-down valve 13 for the opening of the pressure-maintaining valves 12 and 14. These delays are for example in the diagrammatic FIG. 5 4.2 seconds for the valve 12 and 3.9 seconds for the valve 14.

The invention has also been tried out for tubular reactor units having more than one mixing point M. Such plant then contains more than two pressure-maintaining valves of the type of 12 and 14 and more than four reactors of the type IV as essential portions of the plant for the formation of subdivisions A and B or A', A'', A''' and B.

What we claim is:

1. A process for the high pressure polymerization of olefinic monomers which comprises feeding a heated olefinic monomer at high pressure into a tubular reactor having a polymerization zone subdivided into a first zone and at least one additional zone with a pressure-maintaining valve therebetween, initiating polymerization at a constant high pressure in said first zone, and applying in the remaining zone or zones, as the exothermic polymerization progresses therein, periodic decreases in pressure of short duration with constant pressure maintained between said short duration decreases in pressure.

2. A process as claimed in claim 1, cooling the exothermic reaction in said additional zone by external cooling means, and said first zone having a length sufficient to allow the polymerization mixture therein to rise in temperature above the temperature of the coolant before passing into said additional zone.

3. A process as claimed in claim 1 wherein the ratio of the length of said first zone to said additional zone is in the range of 1:1 to about 1:5.

4. A process as claimed in claim 1, and feeding from a separate high pressure feed zone additional olefin monomer into said additional zone.

5. A process as claimed in claim 1, and feeding from separate high pressure feed zones additional olefin monomer to a plurality of positions in said additional zone.

6. A process as claimed in claim 1 wherein said olefinic monomer is ethylene.

References Cited

UNITED STATES PATENTS

| 2,852,501 | 9/1958 | Richard, Jr. et al. | 260—94.9 R |
| 3,405,115 | 10/1968 | Schappert et al. | 260—94.9 R |
| 3,294,773 | 12/1966 | Gans et al. | 260—94.9 R |

FOREIGN PATENTS

| 990,582 | 4/1965 | Great Britain | 260—94.9 R |
| 1,029,172 | 5/1966 | Great Britain | 260—94.9 R |
| 1,152,791 | 5/1969 | Great Britain | 260—94.9 R |

JOSEPH L. SCHOFER, Primary Examiner

A. HOLLER, Assistant Examiner

U.S. Cl. X.R.

260—94.9 P